(12) United States Patent
Atenasio

(10) Patent No.: US 8,959,084 B2
(45) Date of Patent: Feb. 17, 2015

(54) IDENTIFYING LOCATIONS

(75) Inventor: Christopher M. Atenasio, Acton, MA (US)

(73) Assignee: Google Inc., Mountain View, CA (US)

( * ) Notice: Subject to any disclaimer, the term of this patent is extended or adjusted under 35 U.S.C. 154(b) by 2126 days.

(21) Appl. No.: 11/486,404

(22) Filed: Jul. 13, 2006

(65) Prior Publication Data

US 2007/0015119 A1    Jan. 18, 2007

Related U.S. Application Data

(60) Provisional application No. 60/698,775, filed on Jul. 13, 2005.

(51) Int. Cl.
| | | |
|---|---|---|
| G06F 17/00 | (2006.01) | |
| G06F 17/30 | (2006.01) | |
| G06F 17/28 | (2006.01) | |
| G09B 29/10 | (2006.01) | |
| G01C 21/20 | (2006.01) | |
| G09B 25/06 | (2006.01) | |

(52) U.S. Cl.
CPC ........ *G09B 29/106* (2013.01); *G06F 17/30241* (2013.01); *G06F 17/30386* (2013.01); *G01C 21/20* (2013.01); *G09B 25/06* (2013.01)
USPC .................................. 707/724; 704/7; 715/72

(58) Field of Classification Search
CPC ...................... G06F 17/30241; G06F 17/30386
USPC ......................................................... 704/9, 7
See application file for complete search history.

(56) References Cited

U.S. PATENT DOCUMENTS

| | | |
|---|---|---|
| 5,596,500 A | 1/1997 | Sprague et al. |
| 5,839,088 A | 11/1998 | Hancock et al. |
| 6,253,122 B1 * | 6/2001 | Razavi et al. ............... 701/1 |
| 6,295,502 B1 | 9/2001 | Hancock et al. |
| 6,339,744 B1 | 1/2002 | Hancock et al. |
| 6,385,622 B2 | 5/2002 | Bouve et al. |
| 6,408,307 B1 | 6/2002 | Semple et al. |

(Continued)

FOREIGN PATENT DOCUMENTS

JP     2001-134602    5/2001

OTHER PUBLICATIONS

Petras, V., Larson, R. R., & Buckland, M. (2006). Time period directories: a metadata infrastructure for placing events in temporal and geographic context. In Opening information horizons: 6th ACM/IEEE-CS Joint Conference on Digital Libraries: Jun. 11-15, 2006, Chapel Hill, NC, USA: JCDL 2006 (pp. 151-160). New York, NY: ACM Press.*

(Continued)

*Primary Examiner* — Richemond Dorvil
*Assistant Examiner* — Michael Ortiz Sanchez
(74) *Attorney, Agent, or Firm* — Bracewell & Giuliani LLP

(57) ABSTRACT

A computer-implemented method includes receiving in a query a location identifier from a user of a remote device, parsing the input location identifier to generate one or more location-related tokens, querying a repository of location information with the one or more location-related tokens to identify locations for one or more documents having a substantial match to the tokens, scoring the one or more documents using a mass of location for each document that represents the geographical size of a location associated with the document, and presenting information relating to the one or more documents for display using the mass of location.

18 Claims, 9 Drawing Sheets

(56) References Cited

U.S. PATENT DOCUMENTS

| | | | |
|---|---|---|---|
| 6,415,291 B2 | 7/2002 | Bouve et al. | |
| 6,473,692 B2 | 10/2002 | Hancock et al. | |
| 6,597,983 B2 | 7/2003 | Hancock | |
| 6,850,934 B2 * | 2/2005 | Bates et al. | 707/5 |
| 7,117,192 B2 * | 10/2006 | Waltz et al. | 706/48 |
| 7,181,680 B2 * | 2/2007 | Lin et al. | 715/229 |
| 7,209,876 B2 * | 4/2007 | Miller et al. | 704/9 |
| 7,228,299 B1 * | 6/2007 | Harmer et al. | 707/3 |
| 7,343,371 B2 * | 3/2008 | Ibuki et al. | 707/4 |
| 7,376,645 B2 * | 5/2008 | Bernard | 707/3 |
| 7,398,201 B2 * | 7/2008 | Marchisio et al. | 704/9 |
| 7,477,909 B2 * | 1/2009 | Roth | 455/466 |
| 2001/0033225 A1 * | 10/2001 | Razavi et al. | 340/425.5 |
| 2001/0054031 A1 * | 12/2001 | Lee et al. | 705/406 |
| 2002/0004412 A1 * | 1/2002 | Waters | 455/556 |
| 2002/0055924 A1 | 5/2002 | Liming | |
| 2003/0055983 A1 * | 3/2003 | Callegari | 709/227 |
| 2003/0200192 A1 * | 10/2003 | Bell et al. | 707/1 |
| 2004/0044659 A1 | 3/2004 | Judd et al. | |
| 2004/0064334 A1 * | 4/2004 | Nye | 705/1 |
| 2004/0064438 A1 * | 4/2004 | Kostoff | 707/1 |
| 2005/0262062 A1 | 11/2005 | Xia | |
| 2006/0074883 A1 * | 4/2006 | Teevan et al. | 707/3 |
| 2006/0200490 A1 * | 9/2006 | Abbiss | 707/102 |
| 2006/0271531 A1 * | 11/2006 | O'Clair et al. | 707/5 |

OTHER PUBLICATIONS

Ian Densham and James Reid. A geo-coding service encompassing a geo-parsing tool and integrated digital gazetteer service. In Proceedings of the Workshop on the Analysis of Geographic References held at HLT/NAACL 2003, Edmonton, Canada, 2003.*

"Notification Concerning Transmittal of International Preliminary Report on Patentability" dated Jan. 24, 2008.

Japanese Patent Office, Non-Final Office Action, Notice of Reasons for Rejection in JP Patent Application No. 2008-521647, mailed Aug. 23, 2011, 9 pages.

Matsumoto et al., "Information Filtering based on Localness Degree of Web Pages," Proceedings of the Symposium on Databases and Web Information Systems, Japan Information Processing Society of Japan, Dec. 5, 2001, 2001(17):193-200.

Yokoji et al., "Location Oriented Information Collection, Structuring and Retrieval," Information Processing Society of Japan Journal, Japan, Jul. 15, 2000, 41(7):1987-1998.

PCT Search Report (PCT/US2006/027413), dated Jan. 18, 2007.

* cited by examiner

|  | Location1 | Location2 | Location3 |
|---|---|---|---|
| id | "us-ca-mountain_view-amphitheatre_parkway-1600-building_42" | "de-ulm" | "日本2-13-113-渋谷駅" |
| address | "Building 42 1600 Amphitheatre Parkway, Mountain View CA 94043 USA" | "Ulm Deutschland" | "日本東京都渋谷区道玄坂1丁目1 渋谷駅" |
| structured_address | PostalAddress[country_name:"United States" administrative_area_name:"CA" locality_name:"Mountain View" thoroughfare_name:"Amphitheatre Parkway" thoroughfare_number:"1600" premise_name:"Building 42"] | PostalAddress[country_name:"Deutschland" locality_name:"Ulm"] | PostalAddress[country_name:"日本" address_line:"日本東京都渋谷区道玄坂1丁目1" address_line:"渋谷駅"] |
| mass | 1 | 240000 | 2 |
| location_ID | GeoPointProto[latitude:37.422845 longitude:-122.085035] | GeoExactBoundProto[min_latitude:48.19389 min_longitude:9.8613585 max_latitude:48.606103 max_longitude:10.1386415] | GeoPointProto[latitude:35.655536 longitude:139.703739] |

Fig. 2

IDENTIFYING LOCATIONS

CROSS REFERENCE TO RELATED APPLICATION

This application claims the benefit of U.S. Provisional Application Ser. No. 60/698,775, filed Jul. 13, 2005, the contents of which are hereby incorporated by reference in its entirety.

TECHNICAL FIELD

This document relates to the provision of a location identifier, such as latitude/longitude coordinate or GPS coordinates, in response to a different identifier, such as an address, for the same location or locations.

BACKGROUND

Many computing applications require the use of geographic locations. For example, mapping programs need to know where a user is. Travel planning programs need to know the location for the endpoints of a trip, and perhaps the location of multiple waypoints between the endpoints.

As yet another example, "local search," such as Google Local, has become more and more popular. Such local search adds a local component to ordinary search by taking advantage of a known (or at least suspected) location of the searcher. For example, a searcher who enters "furniture" as a search term and who has previously identified his or her zip code, may be provided with a sub-set of search results for businesses within or near that zip code, such as nearby furniture stores. The searcher may also be provided with appropriately targeted local advertising results along with the search results.

These systems generally need to produce relatively precise locations. For example, if a system is going to compute a trip path between two points, it should know those points fairly closely or else the user will be left to guess near each end of the trip. Such systems also generally need unambiguous locations. In other words, if they need to calculate a search for the area around some point, they need to know that they are using the appropriate point, and not some other point with a similar name or description hundreds of kilometers away.

At the same time, it is best if these systems do not demand such unambiguous input from users. Specifically, users will not feel good about a system that requires them to provide a precise location or address, without any typos and with perfect detail. Users certainly do not want to have to provided a latitude and longitude for a location, or provide Global Positioning Service (GPS) or other such coordinates.

Users also do not want to be forced to enter a single appropriate identifier for a location when there are multiple accurate identifiers (e.g., an address that may technically be described as located in either of two cities, or in a city and also a county; or an address on a road that has a number and an official name, and a common name). Moreover, users may want to enter queries without having to explicitly identify which text in the query represents a location, such as by a natural language query. In addition, it may be necessary to be able to associate content, such as web pages, with a location or locations, so as to be able to provide such content in response to a location-based query.

Therefore, there is a need for systems and methods that can generate an accurate computer-usable location identifier from a user-provided human-usable location identifier. There is also a need for systems and methods that can extract an address from a provided query, web page, or other text, to create a computer-usable location identifier. Also, in certain areas such as Japan, human-usable standards for identifying locations can vary widely in syntax and style, making such a conversion especially difficult. Thus, there is a particular need for systems and methods that can generate computer-usable location identifiers even in areas having particularly ambiguous human-usable location identifiers.

SUMMARY

This document discloses methods and systems that assist users of computing and communication devices in entering data into those devices. In one aspect, a computer-implemented method is disclosed. The method comprises receiving in a query a location identifier from a user of a remote device, parsing the input location identifier to generate one or more location-related tokens, querying a repository of location information with the one or more location-related tokens to identify locations for one or more documents having a substantial match to the tokens, scoring the one or more documents using a mass of location for each document that represents the geographical size of a location associated with the document, and presenting information relating to the one or more documents for display using the mass of location.

In some implementations, a query-independent geographical indication may be received from the remote device and used to score the one or more documents. The query-independent geographical indication may be selected from the group consisting of a location where the remote device is located, a bounding box of a map displayed on the device, and a region corresponding to the Internet domain the user is on. The score for a document may include a ratio of the mass of the document to a distance between the query-independent geographic indication and a result. In addition, the step of querying a repository of location information may comprise recursively querying the repository using less specific information until a sufficient number of matches are found, and may also include querying for each permutation of tokens with a token eliminated. The querying a repository may also comprise querying for each permutation of tokens with two tokens eliminated, if a match is not made with one token eliminated, weighting each permutation of tokens, and using the weights to score results from querying each permutation (including by assigning a weight to each token based on its content and adjusting the weight according to the location of the token in the query).

In some implementations, the query may comprise a search request. Also, presenting information relating to the one or more documents for display may comprise presenting a ranked list of search results.

In yet another aspect, a location-based data collection and distribution system is disclosed. The system comprises a request processor to receive data requests from one or more remote clients, a location-based tokenizer that identifies location-related tokens in the data queries, and a result scorer to query a repository of location information with the one or more location-related tokens to identify locations for one or more documents having a substantial match to the tokens, and to score the one or more documents using a mass of location for each document.

In yet another aspect, a location-based data collection and distribution system is disclosed that comprises a request processor to receive data requests from one or more remote clients, a location-based tokenizer that identifies location-related tokens in the data queries, and a means for scoring items responsive to the data request.

In another implementation, a method of identifying location-based information in a corpus of documents is discussed. The method comprises parsing a document in the corpus of documents to generate one or more tokens, comparing combinations of adjacent generated tokens with combinations of tokens in a location-based repository, querying a general database using a combination of adjacent tokens that have a match in the location-based repository, and assigning the adjacent generated tokens as a location for the document if there the query generates a sufficient number of matches.

In one aspect, the location-based repository may comprise token bigrams from a larger repository, and the comparison of adjacent generated tokens with combinations of tokens in the location-based repository may comprise comparing overlapping bigrams from a set of three consecutive tokens. In addition, tokens may be added to the adjacent generated tokens to make an enlarged token set, and the enlarged token set may be compared to the location-based repository. Also, adjacent tokens may be repeatedly added to make enlarged token sets, the enlarged token set compared to the location-based repository until no match results, and the general database may be queried with the largest enlarged token set. The largest enlarged token set may also be reduced to generate a reduced token set if there is no match for the query, the general database requeried with the reduced token set. The general database may also comprise information extracted from documents on the internet.

The systems and techniques described here may provide one or more of the following advantages. A system may provide effective and automated location results independently of the user's location-whether in the United States, the United Kingdom, Japan, China, Korea, India, or other locations that use different addressing schemes than the areas above. Once the data is built into a repository, it is responsive whether it is German, English, or Hebrew. Also, a system may assist a user by providing accurate information quickly, and down to a detailed address level. In addition, the systems and techniques may be used interchangeably with various applications in a flexible manner that does not require much work from the application authors.

The details of one or more embodiments of the invention are set forth in the accompanying drawings and the description below. Other features, objects, and advantages of the invention will be apparent from the description and drawings, and from the claims.

DESCRIPTION OF DRAWINGS

These and other aspects will now be described in detail with reference to the following drawings.

FIG. 2 shows an exemplary organization for a location repository.

Like reference symbols in the various drawings indicate like elements.

DETAILED DESCRIPTION

The systems and techniques described here relate to assistance with obtaining definite location data, such as a latitude and longitude or a particular area, from indefinite data sources, such as queries received by users of a system, and web pages authored by people who did not intend to provide definite location information. In general, the systems operate by parsing received strings to identify tokens that may be location related and matching the tokens to known location identifiers. Particular tokens or sets of tokens may then be scored according to the locational mass of the tokens, perhaps in combination with a locational hint such as the current location of the user submitting a query. Documents may also be scanned for locational information by tokenizing the documents and searching a database using combinations of tokens to determine if those combinations generate any hits. Combinations that generate hits may be considered to be locations identified in the documents.

Figure 1:
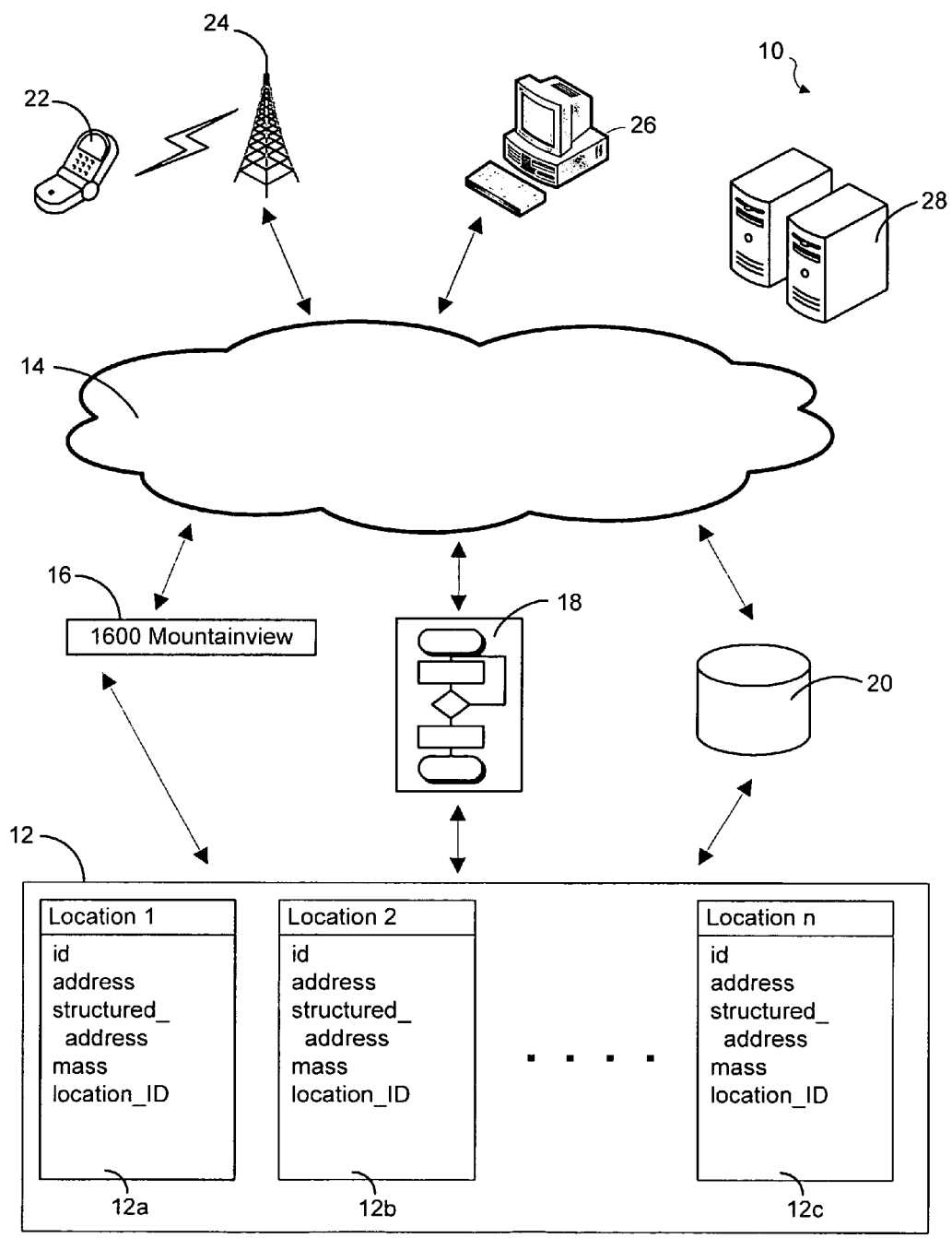
FIG. 1 shows schematically a system for retrieving location identifiers for a variety of applications.

FIG. 1 shows schematically a system 10 for retrieving location identifiers for a variety of applications. In the system 10, a variety of applications make calls to a repository 12 of location information. The repository is established to be highly visible so that it can be used for many purposes with minimal effort. Such an approach of centralizing the information helps the system avoid duplication of location information, and also makes it easier to develop additional location-based applications.

The repository 12 contains a number of location documents 12a-12c which each describe a unique location in the world (though multiple documents may have overlapping locations, and could even describe identical locations in appropriate circumstances). Each location document may include a number of common attributes, including an id, an address, a structured address, a mass, and a location identifier. The id may be a unique identifier string, such as a common street address, or a region name. The address may contain the name by which the location is called. The address may be similar to the id, but in a more readable form. The structured address is a form of the address, broken into portions so that the system 10 may have more control over how the various portions of the address are displayed or presented.

The mass is a description of importance, typically numeric, for the location. In one form, the mass is approximately the number of point addresses contained in the location. For example, a single address might have a mass of 1, while a town might have a mass in the thousands (composed of the total number of single addresses in the town), and a country might have a mass in the hundreds of thousands or millions. Finally, the location identifier may include any appropriate identifier that is usable by the system for computing things such as a map. Specifically, the location identifier may include a lat-long point or combination, the coordinates of a bounding box for a region, or a polygon. The organization of repository documents is described in more detail with respect to FIG. 2 below.

Referring again to FIG. 1, several applications are shown accessing the repository 12. Address description 16 may be, for example, the raw text of a query entered by a user attempting to access a mapping program. Generally, repository 12 provides geocoding services in such a scenario. A geocode answers the question, "I have a small chunk of text describing a location in the world; what is the location it best describes?" As such, the address description 16 may provide the repository (or more accurately, may provide an application working with the repository) with a human-readable address. The system 10 may parse the information and submit it to the repository, and the repository may return a machine usable location identifier related to the query, such as the location ID from a location document.

Query application 18 may also submit requests to the repository 12. Query application 18 may include a variety of applications that receive requests from users or from other applications, and that provide responses to the requests. Queries may be passed to repository 12 (or an application operating with repository), for example, as a string of text, some of which relates to the substantive query and some of which relates to a location. For example, the query might be "sushi restaurants in New York City." In such an example, the repository may return a descriptor, such as a location ID, of the area that bounds New York City.

One common example of a query application is a common search engine, whereby a user can enter a query in any appropriate form, and may be provided as a response a number of web documents (e.g., web pages) or other documents that best match the query. Where the query contains location-related information, the search results may be provided and sorted in part by correlation between the location-related information provided by the user and any location-related information in, or related to, the documents located by the search.

Address extractor 20 may also interact with repository 12. Specifically, address extractor 20 may review a variety of documents, such as those representing content from web pages identified by a crawling process, may extract information from those documents that may be location-related, and may look to match the information against the repository 12 to confirm whether the information is location-related or not. In this manner, a location or locations may be associated with the document so that the document may be identified as a match based on the location or locations in addition to, or as an alternative to, identifying the document as a match by its other content.

Each of the variations in using the repository 12 just mentioned are discussed in more detail below. The communications with repository 12 may generally be carried out by simple remote procedure calls (RPCs) from control logic that interacts with repository 12. In one implementation, geocoding and query parsing are server-side operations using simple RPC interfaces that pass a single argument in each direction—a string with the call and a machine-usable location identifier with the response. Co-location of the repository for these applications lowers roundtrip latency for the repository and makes more powerful feedback-driven algorithms possible. It also may ease implementation maintenance. Address extraction may be implemented as a client-load-heavy library that interfaces with the repository via low-level RPCs. Such an arrangement allows for large address extraction, particularly in parallel, with minimal repository load.

FIG. 2 shows an exemplary organization for a location repository. Each location in the repository is represented by a location document, shown here for clarity as a column in a table. The various parameters for the location document—id, address, structured address, mass, and location identifier—are shown for each of three exemplary locations. The first location is Building 42 on the Google campus in Mountain View, Calif. The second location is the city of Ulm, Germany. The third location is the Shibuya train station in Tokyo, Japan.

As can be seen, the id's can take many forms, while the addresses generally take a more formal format for the name the location is called. The structured address is yet more formal, including tags or meta data corresponding to the various portions of the address, such as the country, state (or administrative area), town (or locality), street (or thoroughfare). As noted above, the mass represents the importance of the location, which may be measure by the "size" of the location per the number of point addresses contained in the bounds of the location. Finally, the location identifier may be any appropriate machine-usable and definite manner in which to express a geographic point or geographic area. One such common approach is latitude and longitude.

Figure 3:
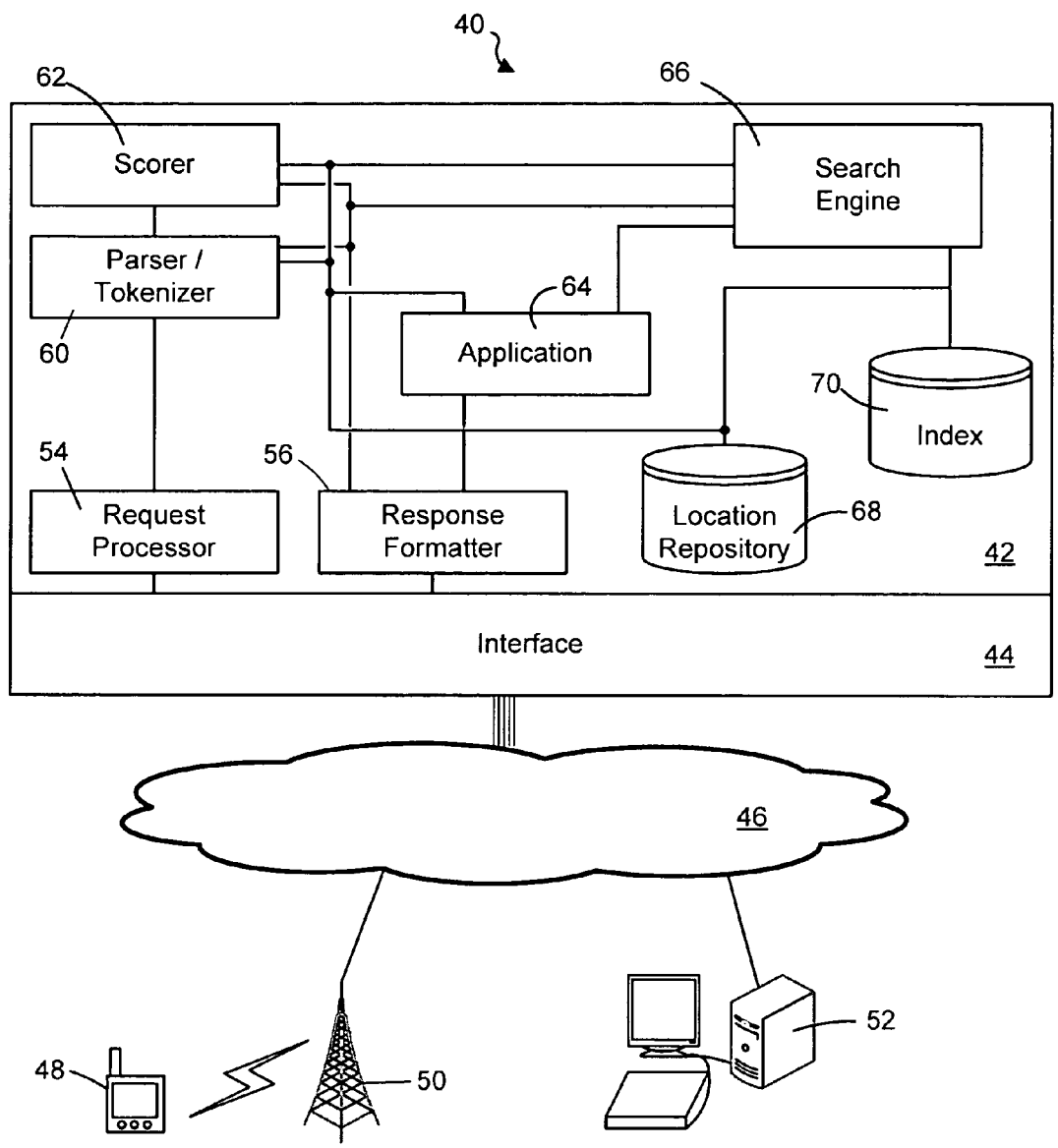
FIG. 3 is a schematic diagram of a system to obtain a location identifier in response to the provision of documents or queries containing location-related information.

FIG. 3 is a schematic diagram of a system 40 to obtain a location identifier in response to the provision of documents or queries containing location-related information. The system 40 includes a sub-system 42 that may be a centrally located group of servers and clients connected to perform a variety of functions. For example, the components of subsystem 42 may be owned and operated by a single organization, with various components open to access by programmers within the organization, such as by RPCs or other techniques.

Sub-system 42 may communicate with the outside world via interface 44 which may in turn communicate with networks such as the Internet 46. In this manner, remote devices such as wireless device 48 (which may include, for example, PDAs, wireless telephones, and other communication devices) operating through wireless network 50, and home or business computer 52, may communicate with sub-system 42. Such communications may include requests such as search requests, along with responses such as links to results from a search request. Interface 44 may take any appropriate form, and may include various network hardware and software according to known standards, such as Ethernet, Infiniband, and others. The particular arrangement of the components in sub-system 42 is not critical to the operations discussed here.

One feature of sub-system 42 may be a search engine 66, which may include all components needed to collect information about documents, or web pages, on the Internet such as by a crawling process, to index those documents such as in index database 70, to receive requests relating to those documents, and to generate results for those requests. Requests from users may be handled initially by request processor 54, such as to format and route the requests for handling by the sub-system 42. Likewise, response formatter 56 may take information generated by sub-system 42 and format it for transmission to user of the system 40. Request processor 54 and response formatter 56 may be, for example, components of a typical web server, and may serve additional functions, such as merging relevant promotional materials with items transmitted to users.

Certain requests may be forwarded to a parser/tokenizer 60 that is part of a location identification system. As described in more detail below, the parser/tokenizer is a component that receives text, such as a string of text from a search request, and breaks it into distinction portions (tokens) that may be analyzed to determine if they represent location-based information, and if so, what that information is.

Tokenized information may be passed from parser/tokenizer to scorer 62. As described in more detail below, the scorer is a component that looks to the information in the tokens to determine how relevant it is for a particular application. For example, the scorer may compare the tokenized information to known location information stored in a location repository 68, such as to locate a match or near match between the tokenized information and a location document in the location repository 68. The scoring may take place according to any appropriate approach, including those described in more detail below.

Application 64 may interact with the other components of sub-system 42 to perform various functions relating to location-based information. Application 64 is shown generally in the figure to indicate that various applications can readily have access to the services provided by parser/tokenizer 60 and scorer 62 and may use the information obtained from those components in any appropriate manner. Parser/tokenizer 60 and scorer 62, in fact, may look like a single component to other components of sub-system 42, particularly where the other components simply need to issue an RPC and wait for a response. Parser/tokenizer 60 and scorer 62 may also be actually combined and may be provided with additional functionality as needed to perform their roles. In addition, they may make requests of, or calls to, other components in carrying out their roles.

In all, system 40 provides a flexible mechanism by which to serve various user needs in a modular componentized fashion. Various applications may be developed to use the location-finding infrastructure just described. If those applications need additional information, they may add to what they receive from the location-finding structures. If such information becomes commonly required, the functionality to provide it may be added to the location-finding structures.

Figure 4:
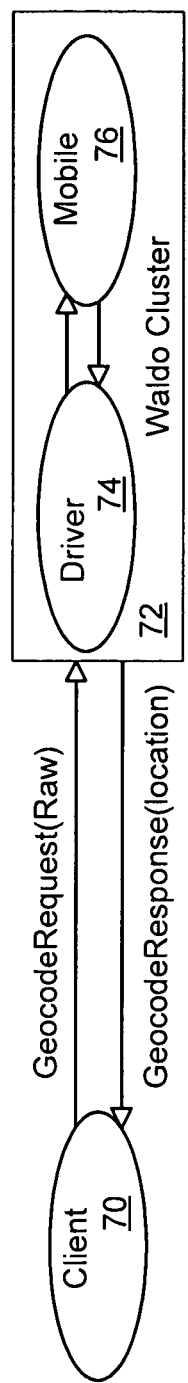
FIG. 4 is a schematic diagram showing information flow in a geocoding system.

FIG. 4 is a schematic diagram showing information flow in a geocoding system. In this particular implementation, a client 70 submits an RPC to a component known as a "Waldo Cluster," named after the well-known character who is often difficult to find in children's books. The request is simply formatted as "GeocodeRequest(raw)," indicating that the client 70 passes a raw string of text to the cluster 72. The response is formatted as "GeocodeResponse(location)," indicating that the response comes back in a simple, predetermined format such as an ordered numerical pair representing a latitude and longitude combination for a location, or the full structure with id, address, structured address, etc.

Within the cluster 74, there is a driver 74, and a mobile 76 component. The driver 74 may be a control loop that makes decisions and interfaces with the mobile 76. The mobile 76 may in turn be comprised of a cluster of servers having multiple leaves that run scorers to decode geographic information. The leaves may be part of a tree of servers, and may be used where retrieval and scoring can be carried out via parallel divide-and-conquer approaches. The particular arrangement of the cluster 72, the driver 74 or the mobile 76, is not critical to the operation of the features described here, and may take any appropriate form that is capable of handling the needed throughput.

Figure 5:
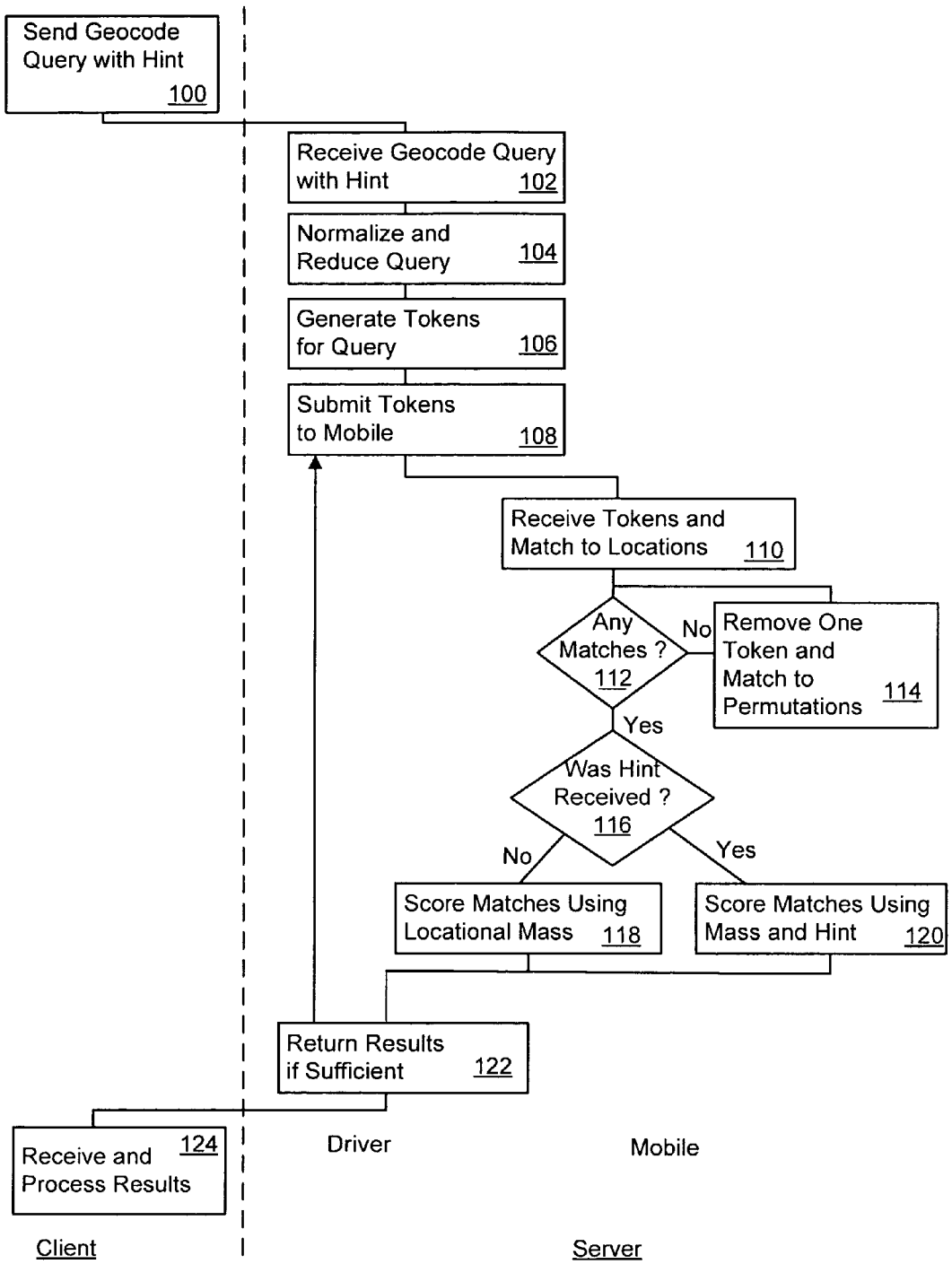
FIG. 5 is a flow chart showing exemplary steps for obtaining geocoding information.

FIG. 5 is a flow chart showing exemplary steps for obtaining geocoding information, such as by the messaging process shown in FIG. 4. The process is broken up by actions taken by a "client" and those by a "server." This representation is shown for clarity and as an example for carrying out the process. No formal client-server architecture is intended to be required by this representation. Rather, a client may simply be a device seeking information, while a server may be a device providing the information. Also, a client may be a device that acts as a server to another device, such as a remote device (e.g., wireless telephone or PDA).

At action 100, the client sends a geocode query. The query may simply be a rough string as entered by a user and received from a remote device (which itself may be considered a client). The query may be, for example, "1060 W. Addison Street, Chicago, Ill. 60613." The client may also transmit a location "hint." Such a hint may include, for example, the point where the user making the query is standing (e.g., as determined by information provided by the user, by triangulation of the user's location, by determining the location of a wireless tower serving the user, or by data in a message header generated by a GPS-enabled device). It may also include the bounding box of a map or view the user is looking at when they make the query. Alternatively, it may be a polygon bounding the area in which the user is located, as determined by the country of the domain the user is on, or the domain of the user.

The server, at action 102, may receive the query, and the hint if it is provided. The query may then be normalized and reduced (action 104). For example, capital letters may be removed, abbreviations may be shortened or lengthened (e.g., "St." to "street" or vice-versa), and punctuation between elements of the string may be removed. Thus, for example, the following three queries may be reduced as follows:

"Building 42 1600 Amphitheatre Parkway, Mountain View Calif. 94043 USA"

"Ulm Deutschland"

"日本東京都渋谷 区道玄坂 1丁目1渋谷駅"

to:

"building 42 1600 amphitheatre parkway mountain view ca 94043 usa"

"ulm deutschland"

"日本東京都渋谷 区道玄坂 1丁目1渋谷駅"

The string may then be tokenized (action 106). In particular, individual elements representing portions of an address may be broken out into distinct tokens for further processing. For example, each level of an address—e.g., unit, building, street number, street, city, state, zip code, and country—may be made into a token for representing the location. The tokenization process may take any appropriate 15 form, and in particular may be a lexicon-loaded trie with left-to-right greedy matching. Tokenized versions of the three queries above could be, for example:

[building_42] [1600] [amphitheatre_parkway] [mountain_view] [ca] [94043] [usa]

[ulm] [deutschland]

[日本] [東京都] [渋谷区] [道玄坂] [1丁目] [1] [渋谷駅]

The particular token sequences may be indexed as individual documents in a tokenspace repository, and related location identifiers, when determined, may be stored as an attachment. When indexing a token, variant forms may also be included. For example, the following tokens on the left will generate the variant forms on the right:

[building_42]->[bldg_42]

[amphitheatre_parkway]->[amphitheatre_pkwy]

[mountain view]->[mv]

[ca]->[california]

[usa]->[us]

[東京都]->[東京]

[渋谷区]->[渋谷]

[1丁目]->[1]

[1]->[1番]

[渋谷駅"]->[渋谷]

The tokens may then be submitted to the mobile component (action 108), which may receive the components and attempt to match them to locations (action 110). In one implementation, the rule by the mobile is to find all location documents that contain all of the tokens in-order, skipping over a maximum of two repository tokens per query token. For each hit, the Mobile reads the document's location from an attachment, attaches it to the result, and uses the result in scoring, as discussed below.

If there are no matches (see action 112), a back-off method may be employed. In such situations, the repository may not contain the specificity for which the user is looking, or the query may be incorrect. In this back-off approach, a new query is formed by combining multiple queries that lack one token, i.e., each permutation of the tokenized string, less one token, is queried to the repository. Thus, where the repository document is:

[building_43] [1600] [amphitheate_parkway] [mountain_view] [94107] [ca] [us]

and the tokenized query is:

[396C] [building_43] [1600] [amphitheatre_parkway] [94106]

there are no hits using a two-token separation rule. That is because the query includes a room specifier that is not in the repository, and the area code is off. The following tokenized strings will then be queries in a first back-off round:

|        | [building_43] | [1600] | [amphitheatre_parkway] | [94106] |
| [396C] |               | [1600] | [amphitheatre_parkway] | [94106] |
|        | [building_43] |        | [amphitheatre_parkway] | [94106] |
| [396C] | [building_43] | [1600] |                        | [94106] |
| [396C] | [building_43] | [1600] | [amphitheatre_parkway] |         |

This set of queries will still generate no hits, so a second level of back-off will be used, so that the following tokenized phrases are queried:

|        |               | [1600] | [amphitheatre_parkway] | [94106] |
|        | [building_43] |        | [amphitheatre_parkway] | [94106] |
|        | [building_43] | [1600] |                        | [94106] |
|        | [building_43] | [1600] | [amphitheatre_parkway] |         |
| [396C] |               |        | [amphitheatre_parkway] | [94106] |
| [396C] | [building_43] | [1600] | [amphitheatre_parkway] | [94106] |
| [396C] |               | [1600] |                        | [94106] |
| [396C] |               | [1600] | [amphitheatre_parkway] |         |
| [396C] | [building_43] |        |                        | [94106] |
| [396C] | [building_43] |        | [amphitheatre_parkway] |         |

Here, a match will be found. In the event there are multiple matches, the high scorer will be returned.

Once matches are found, they may be scored. The scoring may be based on the "mass" of matches, on a hint or hints, or on a combination of the two. Such scoring may resolve ambiguities in results, for example, when a user asks only for "Mountain View" and generates matches for "Mountain View Calif." and "Mountain View Drive, San Antonio Tex." At action 116, the system determines whether a hint was received. If no hint was received, the results may be scored according to their mass, with a result having a higher mass ranked above a result having a lower mass (action 118).

If a hint was received, the hint (e.g., in the form of a location) may be combined with the mass value to generate a score, such that results closer to the hint are given a higher score (action 120). One such scoring technique factors the distance between the hint and a result into the score for the result. The formula may be, for example:

$$Score = mass/(distance(hint, result) + C)$$

where C is an appropriately selected constant.

Where a back-off has been used, results based on the various permutations of tokenized strings may also be weighted appropriately. For example, each token may be assigned a weight based on its contents. As examples, an ascii character may have a weight of one, a phonetic utf8 character may also have a weight of one. A number may have a weight of two, as may combined utf8 characters, and anything else may have a higher weight such as 20. The weights of tokens may then be adjusted according to their position in the string, and the error or distance of a candidate string may be the sum of the weights of the tokens dropped to form it.

With scores made for the matches, the mobile component may pass the result or results to the driver component. The driver component may then analyze the results and return them to the client if they are sufficient (action 122). Finally, the client may take the results, such as a latitude/longitude pair, and use them as appropriate in the application it is running.

Search here may happen in two phases: (1) retrieval, where a list of N(parameter) documents matching the query(token sequence) are found; and (2) scoring, where they are ordered for relevance. Some scoring may be completed during retrieval, e.g., sorting documents by location mass, so that it may be known during retrieval that the top N matches are found when based solely on location score. Thus, for an un-hinted search result, retrieval can be very fast. For a hinted search result, additional queries may need to be examined.

For example, if the query "mountain view" brings up "mountain view, ca" in position 1 and "mountain view drive el paso, tx" in position 3, the system may need to retrieve (and score) 2 extra results for a location-hinted query to work. In addition, and as a result, hinting may not work in some cases. For example, the pedantic query "1" hinted with a latitude/longitude bounding box of a map containing only one house number one is doomed to fail, for example. The retrieval of "1" will likely find many, many documents before the desired document is found, which is not generally practical.

The problem could be addressed by indexing, along with the document, one or more terms describing its latitude/longitude location, so as to retrieve, at retrieval time, only documents in the appropriate region, and have a much shorter list of documents to consider. For example, the earth may be represented using varying levels of triangular meshes, naming the faces, and then associating documents with the faces. This approach may be helpful for certain applications.

Figure 6:
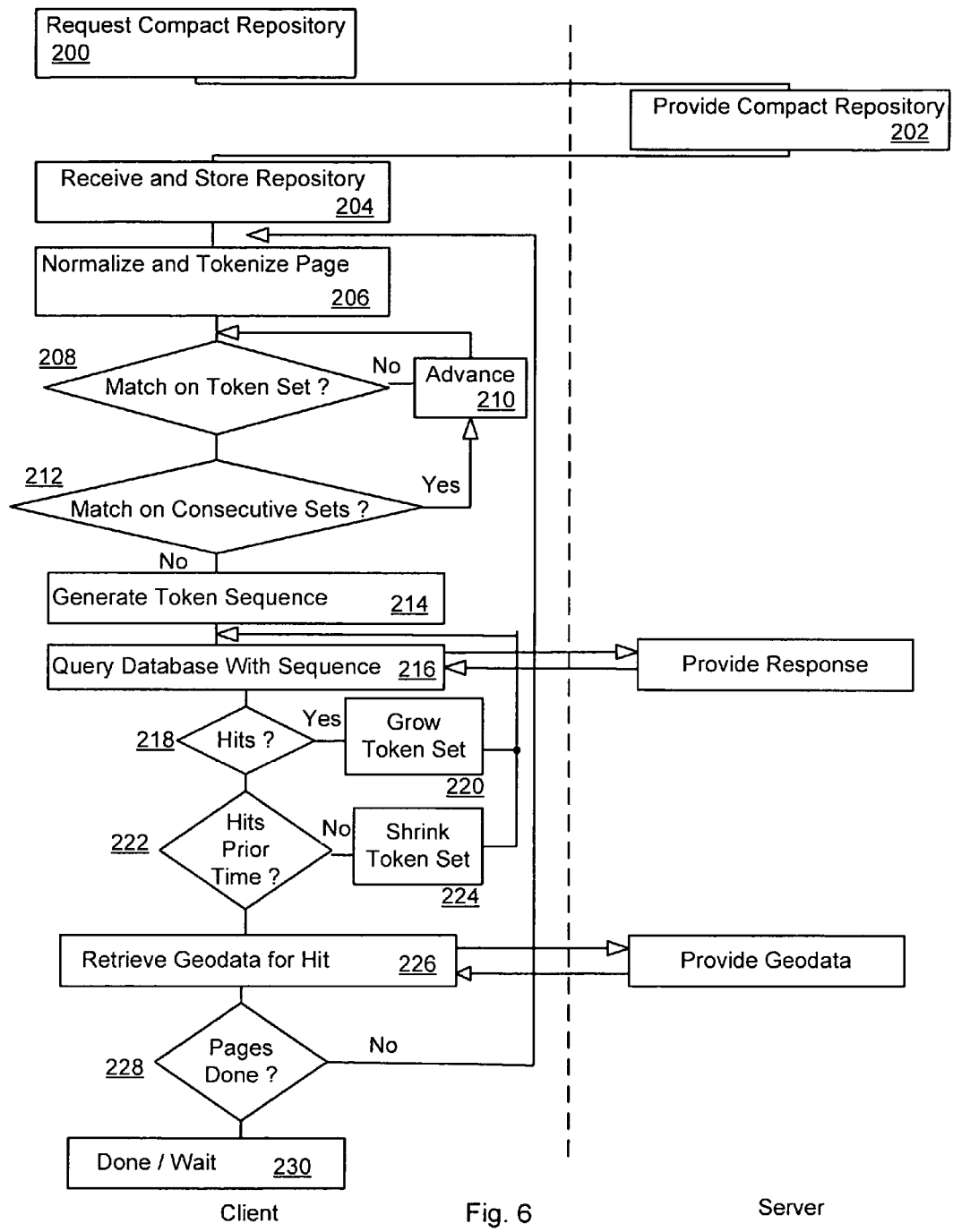
FIG. 6 is a flow chart showing exemplary steps for extracting address information from a document to assign an address to the document.

FIG. 6 is a flow chart showing exemplary steps for extracting address information from a document to assign an address to the document. Generally, this process is appropriate for building an index of location information relating to documents to enable later location-based searching of the documents. One such example is the Google Local service. This process answers the hypothetical question, "I have a document; what addresses does it contain and where in the world are they?"

In general, the pictured process may occur over a compacted web repository on the client-side so as to avoid placing an unnecessary load on the normal repository that may be serving ongoing queries. The compacted repository may be, for example, a Bloom filter of certain bigrams found in the main repository. These bigrams may include, for example, some or all non-number bigrams in the main repository, and also bigrams that skip over a token or two in an address. In certain implementations, the address extraction library may make direct use of the Mobile component. By limiting accesses made to the server in this manner, load on the server can be reduced substantially.

Referring to FIG. 6, the client first makes a request to obtain a compact form of the location repository (action 200), and the server returns that compact form of the repository (action 202). The client may also obtain the full repository if it is able, and may make multiple calls to generate a compact version of the repository itself. Also, various actions described herein may be performed by the server itself, and other actions may be added, removed, or combined as appropriate. Once the client has the compact repository, it may store it for future use 204. The compact version of the repository may also be updated periodically, such as whenever the main repository is updated.

At action 204, the client accesses a first document. Documents may include any relevant type of file to be analyzed, and in which a user might be interested. Common examples include web pages or other mark-up documents, word processor documents, pdf files, databases, e-mails, Usenet group discussions, blogs, catalogs, etc. The document may be scanned to identify elements that are location-related, and those elements may be normalized and tokenized in manners similar to those described above (action 206). The client then scans through the tokens looking for a good address hypothetsis. In one implementation, the client may track a running set of three consecutive tokens, looking for whether the two pairwise combinations in the set of three pass an existence check in the Bloom filter (action 208). For example, where the tokens are A B C, the client checks for the existence of (A B) and (B C).

If there is no match, the client advances to the next set of tokens (action 210) and checks again for matches (action 208). If there is a match on consecutive sets, a token is added to make the entire set larger, until there is no longer a match for the pairwise existence checks in the Bloom filter (action 212). The client then queries the mobile with the generated token sequence (actions 214, 216). If there is a hit or hits, the sequence is grown, and checked again for hits (actions 218, 220); if there is no hit, the sequence is shrunk by a token and retried. The process is repeated until the longest hit-producing token sequence has been found (actions 216, 218 220, 222, 224).

With the largest token sequence for the document located, the location identifier, or geodata, for the corresponding location document is retrieved and attached to the document (action 226). If there are documents left to be extracted (action 228), the system returns to process more documents. If there are no more documents, the system waits (action 230), e.g., until some further command or until additional documents are available. In this manner, relevant address or location information may be located in documents and associated with a machine-usable location identifier.

Figure 7:
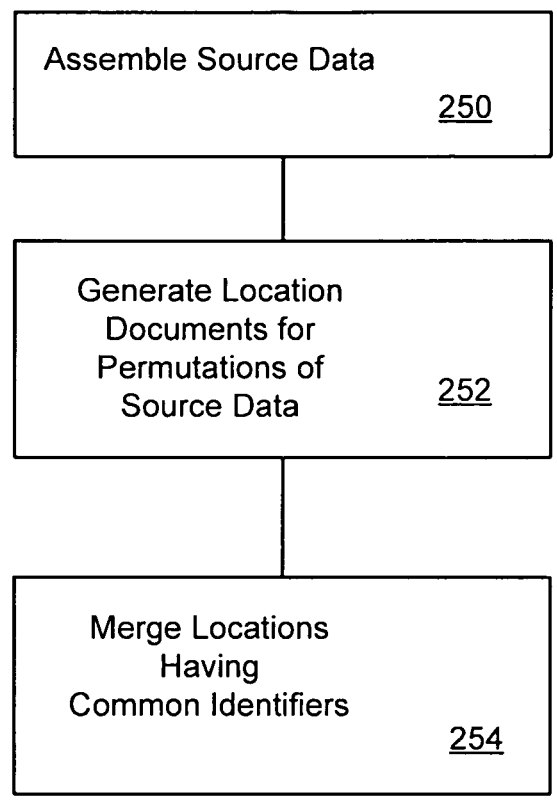
FIG. 7 is a flow chart of exemplary steps for building a repository of location information.

FIG. 7 is a flow chart of exemplary steps for building a repository of location information. Initially, collections of source data may be assembled (action 250). This data may take the format, for example, of the following data:
1600, AMPHITHEATRE PARKWAY, MOUNTAIN VIEW, Calif., 37.422845, 41.72882261
The system may then generate location documents for each permutation of each instance of source data. For the example above, the permutations may be as follows, working from the "smallest" to the "largest":

1600 AMPHITHEATRE PARKWAY
        MOUNTAIN VIEW CA -> 37.422845, 41.72882261
        AMPHITHEATRE PARKWAY
        MOUNTAIN VIEW CA -> 37.422845, 41.72882261
        MOUNTAIN VIEW CA -> 37.422845, 41.72882261
            CA -> 37.422845, 41.72882261

These four permutations, and the permutations for all other points, may then be merged with all other locations having common identifiers. The mass for each individual location (which will generally be 1), for example, may be combined with the mass for all other locations to form a mass number for a broader area, such as California in the example. In logical terms, the mass of all underlying points or areas is combined (per a union operation) to form a mass for an identifier common to those points or areas. Likewise, the boundary of a common identifier is the union of the boundaries of all the underlying areas. The common identifiers may then be accessed when they are requested directly, or as a fall back for an incomplete query, such as "UNKNOWN STREET MOUNTAIN VIEW CA."

Figure 8:
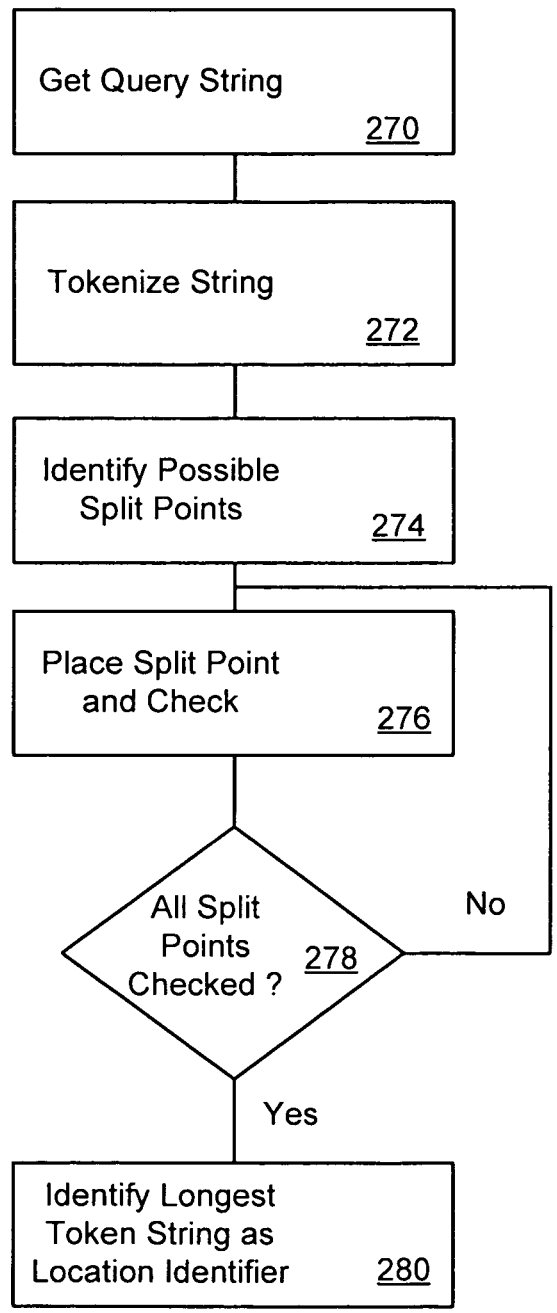
FIG. 8 is a flow chart of exemplary steps for parsing location information from a query.

FIG. 8 is a flow chart of exemplary steps for parsing location information from a query. This method works on the assumption that the query has been submitted generally in the form QL or LQ, where Q is the query-related terms, and L is the location-related terms. For example, for the query "pizza palo alto," Q is "pizza" and L is "palo alto." Additional terms may also be located on either end of the Q and L terms.

The method first obtains the query string (action 270), and then tokenizes the string (action 270), as described in one implementation above. The method then steps through the tokens to identify possible split points that separate the query component from the location component of the string (action 276) until all split points are checked (action 278). At each point, the assumed location-related tokens are tested against a location repository, and the split point is moved iteratively through the string. When all the split points have been checked, or when a sufficient number have been checked, the process identifies the longest token string as the appropriate location identifier. The remainder of the query is taken as the substantive portion of the query. The parsed components of the query string may then be used as appropriate by other applications, such as to generate search results that match the substantive portion of the query, as limited to a local search controlled by the location-based portion of the query.

Figure 9:
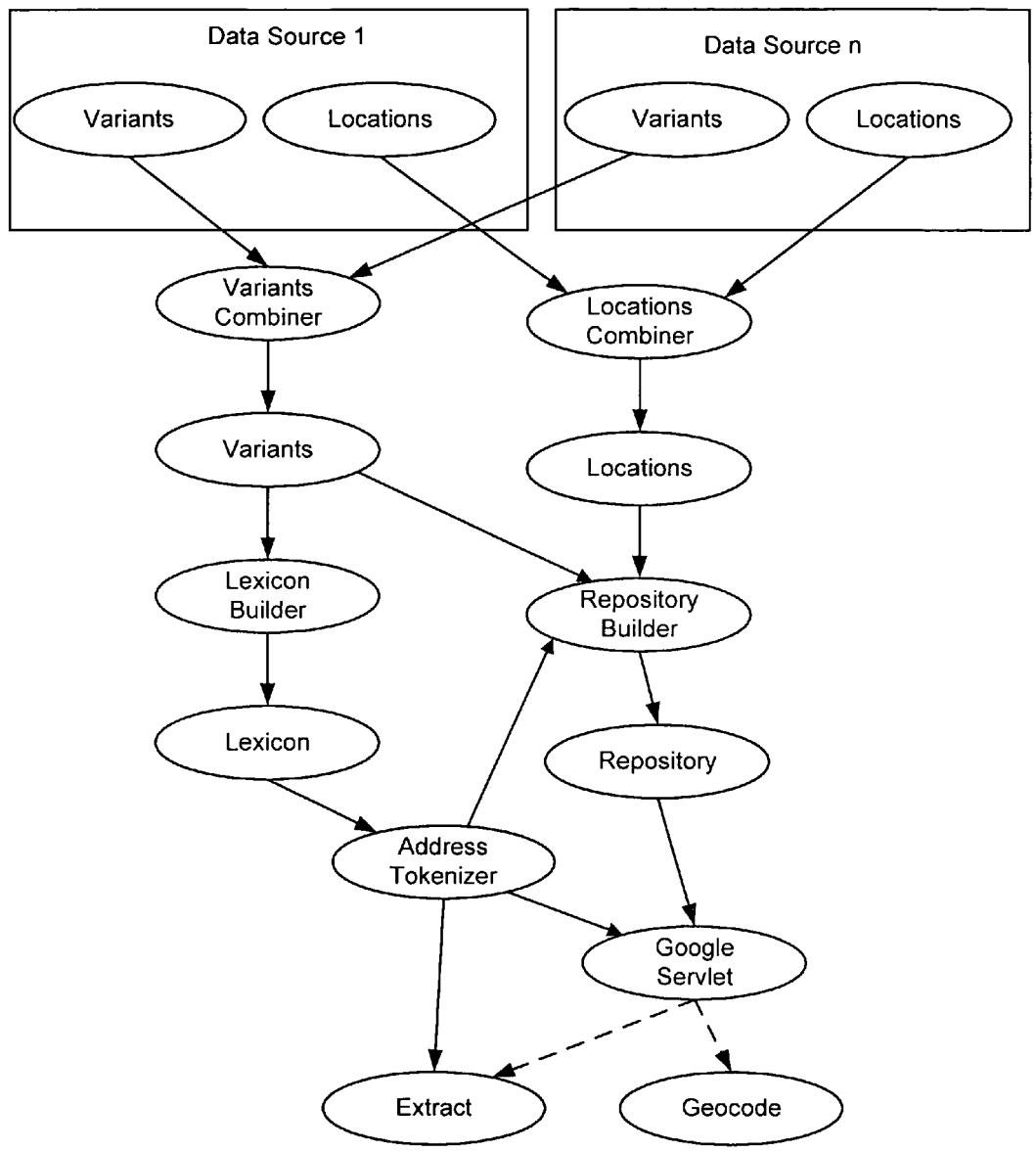
FIG. 9 is a relationship diagram showing components for extracting and geocoding location information.

FIG. 9 is a relationship diagram showing components for extracting and geocoding location information. In this model, an address has a canonical written form, and its components may have written variants. For example, in a Japanese address, the lone "番" used to mark the block number is often written with an ascii or wide dash, so ("番" ->"-") may be a good variant expansion. The reverse however may be a less-accurate expansion. Moreover, if all addresses are in canonical form, a reverse rule may be unnecessary.

A variant is composed of a base term and known written variants. Expansion per (base->variant) may be valid, while (variant ->p; base) may not be.

The locations combiner combines all input location and generates a set of location with addresses unique. In a map phase, the transition may take the form of:
map location->Fingerprint(location.address()), location;
    In a reduction phase, the transition may take the form of:

```
if there are multiple values
   log an error;
output the first value;
```

The variants combiner may merge all variants, such as by performing the transitive expansion: ((a->b) and (b->c))->(a->c). Explained differently,

```
map<string, hash_set<string> > variant_map;
load in all variants into variant_map;
until size of variant_map ceases to grow
```

```
        for each a in variant_map
            for each b of variant_map[a]
                for each c of variant_map[b]
                    variant_map[a].insert(c);
    write out variants;
```

The lexicon builder builds a lexicon out of variants terms, as follows:

```
        set<string> lexicon;
        for each Variant {
            insert base into lexicon;
            insert all variants into lexicon;
        }
        write lexicon to file;
```

The address tokenizer, when given a string, may tokenize it into the set of lexicon words, leaving out any unrecognizable portions. The process may conduct a greedy match. The process may have a hard requirement that it tokenize into the supplied lexicon. In alternative expression:

```
        load lexicon into a trie;
        while there's text left to tokenize {
            find the longest matching lexicon term;
            if a term was found
                add a token and advance the start pointer by
    length(term);
            else
                advance the start pointer by 1;
        }
```

Such an approach may be appropriate for Chinese, Japanese, and Korean address sets. The repository builder builds a repository out of a set of Locations.

```
        load Variants into memory;
        for each Location {
            start a new document;
            use an AddressTokenizer to tokenize
    Location::address;
            for each token {
                index the token;
                add index entries for all variants of the token;
            }
            attach Location::score;
            attach Location::plane_geometry;
        }
```

While some variants may be generable (e.g., "street→St"), others are not. Thus, it may be helpful to hve automatic assistance in generating variants. A mix of manual and automatic variant generation may be used, or fully automatic or fully manual generation may be used to reduce complexity. Also, variants may be inverted—((a ->b)->(b ->a)) and then used at runtime to expand queries The repository may be a composite containing (1) "body" tokenspace—contains the indexed tokens; (2) "score" attachment—contains the location score. (Used for constructing a priority table and during scoring); and (3) "plane_geometry" attachment—contains the PlaneGeometry.

Retrieval may be performed by taking a query string and transforming it into a phrase term, effectively slapping quotes on either side. A [max_separation:n] qualifier may be added on the beginning, to allows for a certain amount of cruft to appear in-between address components. The n factor can be adjusted for better results or performance.

Extraction may take place as follows:

```
        tokenize the string;
        prepend and append made-up(not-in-lexicon) tokens;
        initialize a token range to point to the first token;
        while the range-end isn't beyond the end of the tokens {
            geocode - count the number of addresses matching the
    token range;
            if the count is zero {
                if the last count was 1
                    if the previous token range is a reasonable address
                        geocode the previous token range to get a Location
    and save it;
                move the range-start forward one token;
                if the range start is beyond the range end
                    move the range-end forward one token;
            } else {
                move the range-end forward one token;
            }
        }
        return saved Locations;
```

The features just described for text entry may also be applied to systems that obtain data using voice recognition or other means, such as video recognition. The translation of input from a format such as voice may occur by any of a number of well-known means used to incorporate voice recognition with other data entry technologies. For example, sensed voice commands may be translated into a format such as VoiceXML or other usable format. Also, the system may operate on data entered in various different languages.

Other methods for providing input may also be used as appropriate. For example, the device may be provided with an accelerometer that may provide input. For example, the user may jerk the device to indicate that a term has been entered. Also, the user may selected items, such as from a list, by tilting the device forward or backward.

As used herein, the terms "electronic document" and "document" mean a set of electronic data, including both electronic data stored in a file and electronic data received over a network. An electronic document does not necessarily correspond to a file. A document may be stored in a portion of a file that holds other documents, in a single file dedicated to the document in question, or in a set of coordinated files.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor. The processes described here may be implemented as commands that are carried out when instructions stored on a machine-readable medium or a machine-readable signal are carried out.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although a few embodiments have been described in detail above, other modifications are possible. Portions of this disclosure discuss operation though portable devices with constrained keyboards, but any of a number of devices may be assisted, including fully-functional computers with full keyboards. Also, the logic flows depicted in the figures do not require the particular order shown, or sequential order, to achieve desirable results. Also, other steps may be provided, or steps may be eliminated, from the described flows, and other components may be added to, or removed from, the described systems. Other embodiments may be within the scope of the following claims.

What is claimed is:

1. A computer-implemented method, comprising:
   receiving, by one or more computers, a query from a computing device;
   identifying one or more tokens in the received query:
   querying, by the one or more computers, a repository of location information with the one or more tokens to identify one or more location documents associated with a location that substantially matches the tokens, each of the location documents having an identifier, a structured address, and a mass of location that is approximately the number of point addresses contained in the location associated with the location document;
   using, by the one or more computers, the mass of location to score the identified location documents when more than one location documents are identified and using the scores to select a particular location document from the identified location documents; and
   responding, by the one or more computers, to the query with the location associated with the selected location document at the computing device.

2. The method of claim 1, further comprising receiving a query-independent geographical indication with the query and using the query-independent geographical indication to score the one or more identified location documents.

3. The method of claim 2, wherein the query is received from a remote device, and the query independent geographical indication is selected from the group consisting of a location where the remote device is located, a bounding box of a map displayed on the device, and a region corresponding to an Internet domain from which the query was received.

4. The method of claim 2, wherein using the mass of location to score the identified location documents comprises determining a ratio of the location document's mass of location to a distance between the query-independent geographic indication and the location document's associated location.

5. The method of claim 1, wherein querying a repository of location information with the one or more tokens comprises recursively querying the repository using a smaller number of the one or more tokens until one or more location documents are identified having locations that match the smaller number of the one or more tokens.

6. The method of claim 5, wherein querying the repository using a smaller number of the one or more tokens comprises querying the repository with a plurality of permutations of the one or more tokens, wherein each permutation is formed by removing one of the one or more tokens.

7. The method of claim 6, wherein querying the repository using a smaller number of the one or more tokens comprises querying the repository with a plurality of permutations of the one or more tokens, where each permutation is formed by removing two of the one or more tokens.

8. The method of claim 6, further comprising, weighting each permutation of the one or more tokens and using the weights to score results from querying the repository using each permutation.

9. The method of claim 8, wherein the weighting comprises assigning a weight to each token based on its content and adjusting the weight according to the location of the token in the query.

10. A location based data collection and distribution system, comprising:
    one or more memories storing instructions; and
    one or more processors configured to execute the instructions stored in the one or more memories to:
    receive a query;
    identifying one or more tokens in the received query:
    query a repository of location information with the one or more tokens to identify one or more location documents associated with a location that substantially matches the tokens, each of the location documents having an identifier, a structured address and a mass of location that is approximately the number of point addresses contained in the location associated with the location document;
    use the mass of location to score the identified location documents when more than one location documents are identified and using the scores to select a particular location document from the identified location documents; and
    respond to the query with the location associated with the selected location document.

11. The location based data collection and distribution system of claim 10, wherein the one or more processors are further configured to receive a query-independent geographical indication with the query and using the query-independent geographical indication to score the one or more identified location documents.

12. The location based data collection and distribution system of claim 11, wherein the query is received from a remote device, and the query independent geographical indication is selected from the group consisting of a location where the remote device is located, a bounding box of a map displayed on the device, and a region corresponding to an Internet domain from which the query was received.

13. The location based data collection and distribution system of claim 11, wherein the one or more processors are further configured to score the identified location documents by determining a ratio of the location document's mass of location to a distance between the query-independent geographic indication and the location document's associated location.

14. The location based data collection and distribution system of claim 10, wherein the configurations to query the repository of location information with the one or more tokens comprise configurations to recursively query the repository using a smaller number of the one or more tokens until one or more location documents are identified having locations that match the smaller number of the one or more tokens.

15. The location based data collection and distribution system of claim 14, wherein the configurations to query the repository using a smaller number Of the one or more tokens comprise configurations to query the repository with a plurality of permutations of the one or more tokens, wherein each permutation is formed by removing one of the one or more tokens.

16. The location based data collection and distribution system of claim 15, wherein the configurations to query the repository using a smaller number of the one or more tokens comprise configurations to query the repository with a plurality of permutations of the one or more tokens, where each permutation is formed by removing two of the one or more tokens.

17. The location based data collection and distribution system of claim 15, wherein the one or more processors are further configured to weight each permutation of the one or more tokens and using the weights to score results from querying the repository using each permutation.

18. The location based data collection and distribution system of claim 17, wherein the configurations to weight comprise configurations to assign a weight to each token based on its content and adjusting the weight according to the location of the token in the query.

* * * * *